Dec. 12, 1950  H. E. WOLFE  2,533,657
GRAFTING KNIFE
Filed May 14, 1948
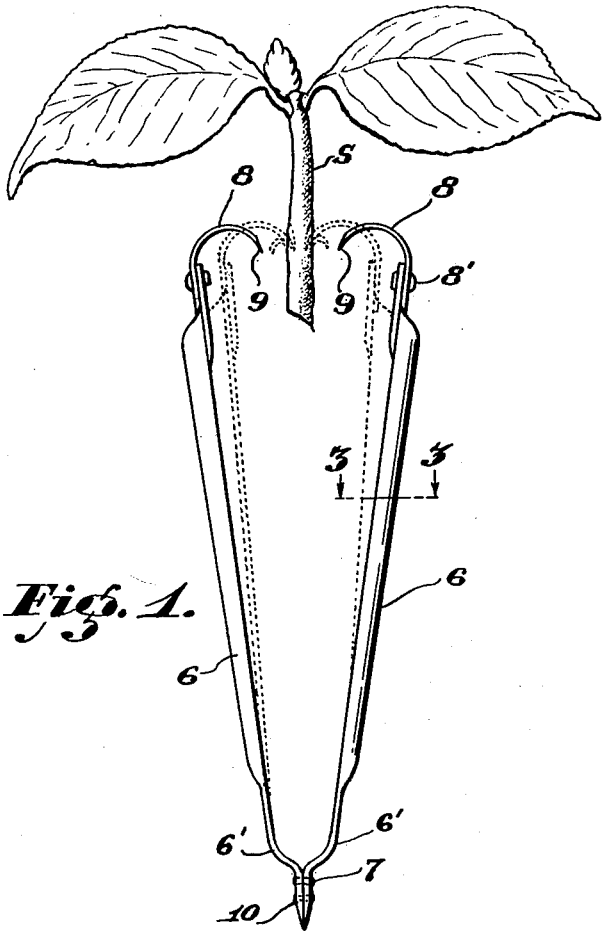
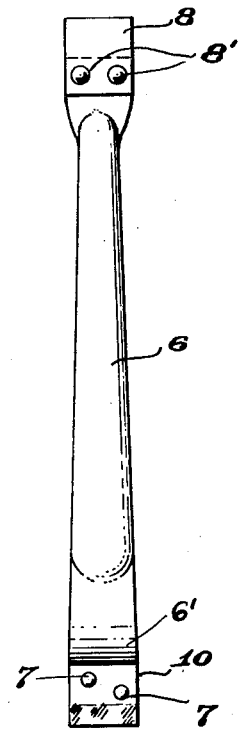
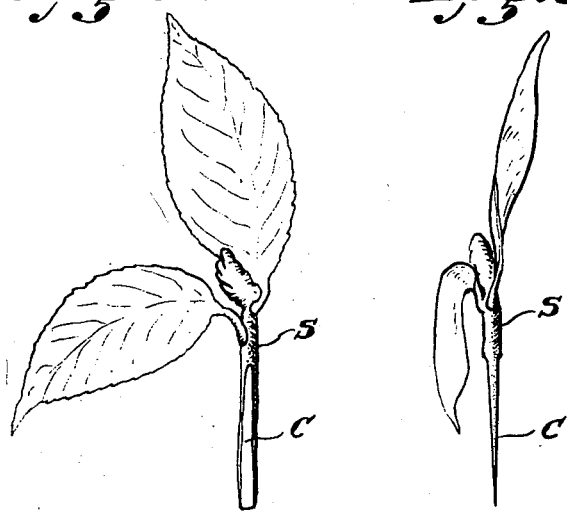
INVENTOR
Helen E. Wolfe;
By R. S. Berry
ATTORNEY Patented Dec. 12, 1950

2,533,657

UNITED STATES PATENT OFFICE 2,533,657

GRAFTING KNIFE

Helen E. Wolfe, Arcadia, Calif.

Application May 14, 1948, Serial No. 26,961

4 Claims. (Cl. 47—6)

This invention relates to knives and like implements for preparing scions for grafting.

It is the primary object of this invention to provide a grafting knife in which coacting blades are constructed and arranged in such manner that the implement may be quickly and easily operated without the exercise of any particular skill to trim the end of a scion with a proper and uniformly wedge shaped formation best to effect a successful grafting operation.

Another object of the present invention is to provide an implement of the character described which may be successfully used in connection with scions of various sizes, especially those of very small diameter, without likelihood of overcutting or otherwise improperly trimming the scions as is often the case where an ordinary knife or like single bladed cutting implement is used, it only being necessary with my implement to grip the scion between the blades and pull on the implement to assure a proper wedge cut per scion.

Another object is to provide an implement such as described in which the handles thereof are formed to provide a spring action normally holding the blades apart, also to provide a slit-opening blade for opening the scion-receiving slit in stem or limb of a plant.

A further object is to provide an implement such as described which is of simple and inexpensive construction and consists of a "one-piece" formation with all parts in connected or joined relation so that the implement is compact and may be readily packed and shipped in small compass and easily manipulated with one hand.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevational view of a grafting knife embodying the present invention, the dotted lines indicating how the knife is applied for forming a wedge shape end on a scion;

Fig. 2 is an elevational view of the knife taken at right angles to Fig. 1;

Fig. 3 is a sectional view taken on the line 3—3 of Fig. 1;

Fig. 4 is an elevational view of a scion as prepared for grafting with the knife hereof, and Fig. 5 is an elevational view of the scion taken at right angles to Fig. 4.

Referring to the drawing more specifically it will be seen that one embodiment of my invention generally includes like stiff and non-pliable metal handles 6 fixed together at certain ends by means of rivets 7 and provided at their other ends with the like arcuate blades 8 having opposed cutting edges 9. The blades are fastened in place by means of rivets 8' but it is obvious they could be formed as integral parts of the handles if desired.

The handles 6 are substantially straight except for resilient curved portions 6' adjacent the riveted ends, which curved portions constitute opposed spring members which are tensioned to normally spread the handles and blades apart in diverging relation subject to being pressed toward one another as shown in dotted lines in Fig. 1, in the use of the knife, the handles and blades springing apart to the full line position when the handles are released.

The abutting and riveted end portions of the handles 6 are reduced in thickness toward their free ends to form a wedge shaped blade 10 which is used for making scion-receiving slits in the limbs and stems of plants or for opening such slits which may be formed preparatory to reception of the wedge shaped ends of the scions.

It should be noted that the curved blades 8 are matched and of nearly semi-circular form with the outer ends thereof consituting the cutting edges 9 presented toward the connected ends of the handles 6—6 so that when brought into contact with opposite sides of a scion such as the one S shown in Fig. 1 and exerting a longitudinal pull on the implement the cutting edges 9 will diagonally penetrate the scion as indicated in dotted lines in Fig. 1. Due to the curvature of the blades 8 the wedge cuts are somewhat concaved between their ends thereby producing a long bevel per blade and a substantially uniform taper or wedge formation which removes the bark from the scion along the cuts only and leaves the bark uninterrupted along the narrow edges of the wedge shaped end of the scion or in other words uninterrupted from end to end of the scion, except where the bevel or wedge cuts are made.

As the operator pulls on the handles, the cutting edges 9 of the blades 8 will bite diagonally into and be guided by the scion to form a long wedge or bevel cut of a uniform nature, it being unnecessary that any particular skill be exercised as the cuts are automatically made alike and the cutting edges will meet and thus produce a thin end as the cut or trim is completed. Of course the cut or trim may be controlled as to depth and length by increasing or decreasing the pressure on the handles and it is apparent that the action of the spring portions 6'—6' of the handles comes into play during this operation, thus providing nicety of control of the cutting action.

As here shown the handles 6 are curved in cross section for reinforcing the handles and providing comfortable gripping surfaces.

As the cutting edges 9 are straight and the blades are curved in a pronounced manner upwardly and outwardly from said edges, the cuts made in the scion are directed angularly downwardly and inwardly so that instead of immediately cutting clear through the scion, the cuts progress downwardly and result in a long wedge shaped end being formed when the blades come together.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a grafting knife, a pair of like opposed and arcuate blades having straight cutting edges on certain corresponding ends thereof disposed to be simultaneously brought into contact with opposite sides of the stem of a scion to be grafted, and opposed handles joined at certain corresponding ends and carrying said blades on their other ends; the cutting edges of said arcuate blades being presented toward the joined ends of said handles.

2. In a grafting knife, a pair of opposed handles joined at certain corresponding ends and normally spaced apart at their other ends, and curved blades fixed on said other ends so that certain ends of the blades curve inwardly, said inwardly curved ends of said blades being formed with straight cutting edges presented toward the joined ends of said handles.

3. In a grafting knife, a pair of opposed handles joined at certain corresponding ends and having their other ends normally spread apart and subject to being forced toward one another on gripping and squeezing the handles toward one another, blades fixed on said other ends of said handles having transverse cutting edges opposed to one another and adapted to be brought into contact with opposite sides of the stem of a scion and drawn along said stem to make cuts forming a wedge-shaped end on said stem; the cutting edges of said arcuate blades being presented toward the joined ends of said handles.

4. A grafting knife comprising a pair of stiff and unpliable diverging handles having free outer ends, opposed spring members on contiguous inner ends of said handles fixed together and tensioned to normally hold the outer ends of the handles spread apart in diverging relation, opposed arcuate blades carried on the outer ends of said arms projecting inwardly therefrom and terminating in spaced relation to each other, said blades having transverse cutting edges on the outer ends presented toward the inner ends of said handles; said handles being moveable under pressure imposed thereon in opposition to said spring members to bring the cutting edges on said blades into contact with the stem of a scion so that on imparting a pull on said handle with said cutting edges so positioned, such edges will be bite diagonally into the scion and form a beveled cut thereon.

HELEN E. WOLFE.

REFERENCES CITED

The following references are of record in the file of this patent:

UNITED STATES PATENTS

| Number | Name | Date |
| --- | --- | --- |
| Re. 14,169 | Aaron | July 25, 1916 |
| 340,699 | Congar | Apr. 27, 1886 |
| 340,700 | Congar | Apr. 27, 1886 |
| 1,042,965 | Priest | Oct. 29, 1912 |

FOREIGN PATENTS

| Number | Country | Date |
| --- | --- | --- |
| 91,073 | Sweden | Dec. 14, 1937 |